T. H. HATHAWAY.

APPARATUS FOR SEALING GUMMED PAPER.

No. 11,096. Reissued July 22, 1890.

WITNESSES

J. W. Hartnett.

B. W. Williams

INVENTOR

Thomas H. Hathaway,

By his Att'y

Henry W. Williams

THE NORRIS PETERS CO., PHOTO-LITHO., WASHINGTON, D. C.

UNITED STATES PATENT OFFICE.

THOMAS HATHAWAY HATHAWAY, OF NEW BEDFORD, MASSACHUSETTS.

APPARATUS FOR SEALING GUMMED PAPER.

SPECIFICATION forming part of Reissued Letters Patent No. 11,096, dated July 22, 1890.

Original No. 424,200, dated March 25, 1890. Application for reissue filed May 9, 1890. Serial No. 351,210.

*To all whom it may concern:*

Be it known that I, THOMAS HATHAWAY HATHAWAY, of New Bedford, in the county of Bristol and State of Massachusetts, have invented a new and Improved Mollifier or Apparatus for Moistening and Sealing Gummed Articles, of which the following is a full, clear, and exact description.

The object of my invention is to provide a new and improved mollifier or apparatus for moistening and sealing gummed articles, such as envelopes, newspaper-wrappers, postage-stamps, &c.

The invention consists of various parts and details and combinations of the same, hereinafter more fully described, and set forth in the claims.

Reference is to be had to the accompanying drawings, forming a part of this specification, in which similar letters of reference indicate corresponding parts in all the figures.

Figure 1:
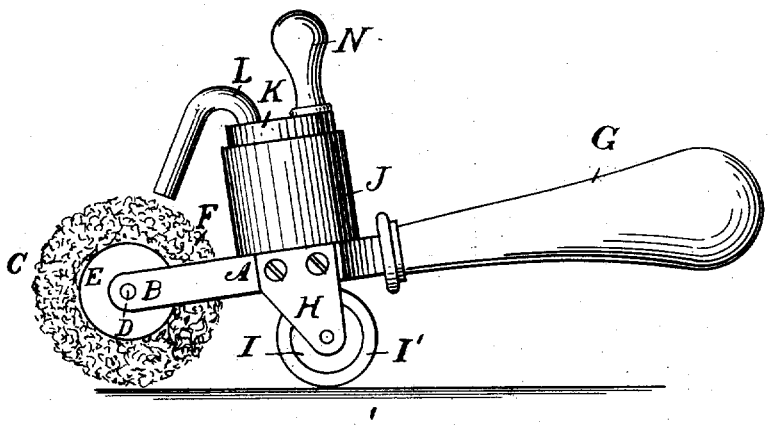
Figure 2:
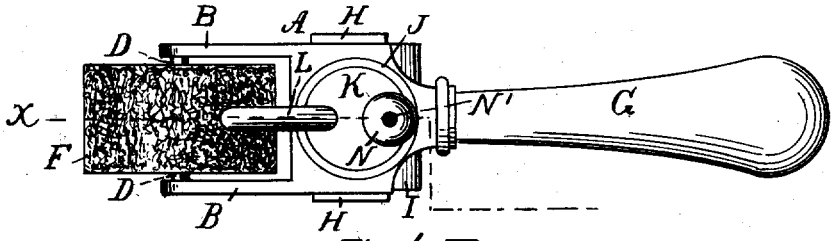
Figure 3:
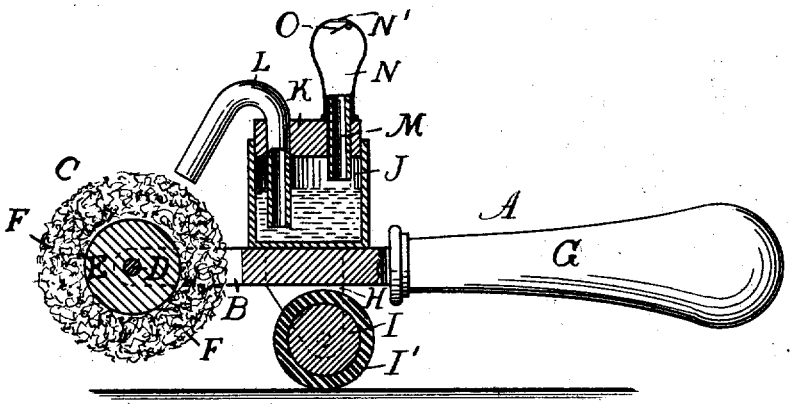

Figure 1 is a side elevation of my improvements. Fig. 2 is a plan view of the same, and Fig. 3 is a longitudinal sectional elevation of the same on the line *x x* of Fig. 2.

The frame A is provided on its front end with the fork B, in which is mounted the roller C upon axle D. Roller C is covered with any suitable absorbent material F.

The rear end of the frame A is provided with a handle G, and on the sides of the frame A are downwardly-projecting lugs H, between which is mounted to rotate the pressure or sealing roller I, preferably covered with rubber I′.

Suitably arranged upon the frame A is secured a receptacle J, containing water or other moistening substance and provided with a tight cover K, through which passes a bent tube L, which reaches with one end to or near the bottom of the receptacle J, and the other end is nearly in contact with the upper edge of the covered roller C. A second tube M passes through the cover K and terminates above the liquid contained in receptacle J, the upper end of the tube M being provided with a rubber air-bulb N. This constitutes an air-forcing device.

An aperture N′ may, if desired, be made in the top of bulb N, and the aperture may, if desired, be adapted to be closed by an inwardly-opening valve O.

The operation is as follows: In order to moisten the gummed part of papers to be sealed—such as envelopes, postage-stamps, or other articles—the operator takes hold of the handle G and rolls the moistened roller C over the gummed part of the paper, so as to moisten the gum. With the left hand the operator then folds the moistened gummed part over the part to which it is to be sealed and then brings the apparatus into the position shown in Fig. 3 by pressing the handle G downward, the roller I acting as a fulcrum, and by then moving the pressure-roller I over the folded parts of the paper the moistened gummed part is securely sealed to its opposite part. Postage-stamps are similarly sealed to the envelope by moistening the gummed parts by passing the roller C over them, after which the stamps are laid with the gummed side down on the envelope, and the pressure-roller I is rolled over the faces of the stamps in the same manner as above described, which seals the stamps effectually and quickly to the envelope. The roller C is moistened by pressing the air-bulb N, so that an air-pressure is exerted on the water in the receptacle J, which causes the water to pass into the bent tube L and out of the same at the outer end upon the absorbent material of the roller C.

Having thus fully described my invention, I claim as new and desire to secure by Letters Patent—

1. In an apparatus for moistening and sealing gummed articles, a frame or carrier, an absorbent roller, a sealing-roller, and a device supported by the frame or carrier for supplying said absorbent roller with moistening material.

2. The combination of the frame, the receptacle with discharge-pipe and air-bulb, the absorbent roller, and sealing-roller, substantially as described and set forth.

3. As an improved article of manufacture, the within-described apparatus for moistening and sealing gummed articles, consisting of a suitable frame carrying an absorbent roller, a receptacle for containing and delivering a liquid to the absorbent roller, and an air-forcing device for expelling the liquid from the receptacle, all constructed for conjoint operation, as set forth.

THOMAS HATHAWAY HATHAWAY.

Witnesses:

WILLIAM FRANCIS CASWELL,

HENRY HOWLAND CRAPO.